(12) United States Patent
Hashimoto et al.

(10) Patent No.: US 10,306,236 B2
(45) Date of Patent: May 28, 2019

(54) IMAGE CODING DEVICE AND IMAGE DECODING DEVICE

(71) Applicant: Renesas Electronics Corporation, Tokyo (JP)

(72) Inventors: Ryoji Hashimoto, Tokyo (JP); Seiji Mochizuki, Tokyo (JP); Kenichi Iwata, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days.

(21) Appl. No.: 15/697,143

(22) Filed: Sep. 6, 2017

(65) Prior Publication Data

US 2017/0366817 A1 Dec. 21, 2017

Related U.S. Application Data

(63) Continuation of application No. 13/978,136, filed as application No. PCT/JP2011/078135 on Dec. 6, 2011, now Pat. No. 9,787,981.

(30) Foreign Application Priority Data

Jan. 19, 2011 (JP) ................................ 2011-008902

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC ........... H04N 19/00569; H04N 19/105; H04N 19/50; H04N 19/70; H04N 19/159
(Continued)

(56) References Cited

U.S. PATENT DOCUMENTS 7,474,699 B2  1/2009 Kobayashi et al.
2003/0202588 A1  10/2003 Yu et al.
(Continued)

FOREIGN PATENT DOCUMENTS

CN  1550109 A  11/2004
CN  101039434 A  9/2007
(Continued)

OTHER PUBLICATIONS

Office Action dated Sep. 22, 2016, in Taiwanese Patent Application No. 100147987.
(Continued)

*Primary Examiner* — Jamie J Atala
*Assistant Examiner* — Kathleen V Nguyen
(74) *Attorney, Agent, or Firm* — Shapiro, Gabor and Rosenberger, PLLC

(57) ABSTRACT

In terms of the transmission of the coding method, it is ensured to decode information coded according to the intra-frame prediction coding with vector information. An error of a piece of divisional image information targeted for image prediction coding and a piece of predicted information is determined to perform prediction coding. A data stream in which a piece of information for identifying a prediction method and a piece of information subjected to prediction coding according to the method are arranged is produced according to the process sequence of the prediction coding for each process on the divisional image information. At this time, the data stream has a pair of vector information and the error information as information subjected to prediction coding for each process on the divisional image information on condition that the prediction method is intra-frame prediction coding with vectors.

5 Claims, 10 Drawing Sheets

(51) Int. Cl.
  *H04N 19/50*  (2014.01)
  *H04N 19/70*  (2014.01)
  *H04N 19/176*  (2014.01)
  *H04N 19/119*  (2014.01)
  *H04N 19/593*  (2014.01)
  *H04N 19/11*  (2014.01)

(52) U.S. Cl.
  CPC ......... *H04N 19/119* (2014.11); *H04N 19/176* (2014.11); *H04N 19/50* (2014.11); *H04N 19/593* (2014.11); *H04N 19/70* (2014.11)

(58) Field of Classification Search
  USPC .................................................... 376/240.12
  See application file for complete search history.

(56) References Cited

U.S. PATENT DOCUMENTS

| | | | |
|---|---|---|---|
| 2004/0233989 A1* | 11/2004 | Kobayashi | H04N 19/105 375/240.16 |
| 2007/0217507 A1* | 9/2007 | Kazui | H04N 19/139 375/240.03 |
| 2008/0175317 A1 | 7/2008 | Han et al. | |
| 2010/0074338 A1 | 3/2010 | Yamori et al. | |
| 2010/0232505 A1 | 9/2010 | Thoreau et al. | |
| 2011/0249739 A1* | 10/2011 | Liu | H04N 19/176 375/240.12 |
| 2011/0280305 A1* | 11/2011 | Mochizuki | H04N 19/61 375/240.12 |

FOREIGN PATENT DOCUMENTS

| | | |
|---|---|---|
| JP | 4163618 B2 | 10/2008 |
| JP | 2009-527169 A | 7/2009 |
| KR | 10-2007-0093781 A | 9/2007 |
| WO | WO 2008/126135 A1 | 10/2008 |
| WO | WO 2009/089032 A2 | 7/2009 |
| WO | WO 2010/082231 A1 | 7/2010 |

OTHER PUBLICATIONS

Iwata et al., "Intra prediction based on repetitive pixel replenishment with adaptive block size", $4^{th}$ Meeting: Daegu, KR, Jan. 15, 2011 (Joint Collaborative Team on Video Coding (JCT-VC) of ITU-T SG16 WP3 and ISO/IEC JTC1/SC29/WG11).

Balle et al., "Extended texture prediction for H.264/AVC intra coding", 31. VCEG Meeting; 79. MPEG Meeting; Jan. 14, 2007, Marrakesh; (Video Coding Experts Group of ITU-T SG. 16).

Yu et al., "New intra prediction using intra-macroblock motion compensation", Joint Video Team (JVT) of ISO/IEC MPEG & ITU-T VCEG (ISO/IEC JTC1/SC29/WG11 and ITU-T SG16 Q.6, JVT-C151, $3^{rd}$ Meeting, Fairfax, Virginia, USA, May 6, 2002, pp. 1-3.

Balle et al., "Extended texture prediction for H.264/AVC intra coding", Image Processing, 2007, ICIP 2007, IEEE International Conference ON, IEEE, PI, Sep. 1, 2007, pp. VI-93.

Extended European Search Report dated Nov. 8, 2016, in European Application No. 11856135.6.

ITU-T H.264, Series H: Audiovisual and Multimedia Systems Infrastructure of audiovisual services—Coding of moving video. Advanced video coding for generic audiovisual services, International Telecommunication Union, Nov. 2007.

ISO/IEC 14496-10, Information Technology—Coding of audio-visual objects—Part 10: Advanced Video Coding, Second Edition, Oct. 1, 2004.

Office Action dated Dec. 5, 2013, in Japanese Patent Application No. 2012-553573.

Office Action dated Jan. 5, 2016, in Chinese Patent Application No. 201180065477.2.

Office Action dated Aug. 6, 2015, in Japanese Patent Application No. 2014-198305.

Office Action dated Apr. 13, 2017, in Korean Patent Application No. 10-2013-7018980.

Office Action dated May 31, 2017, in Taiwanese Patent Application No. 100147987.

Kondo et al., "Tree structured hybrid intra prediction", International Conference on Image Processing, Oct. 2004, Piscataway, NJ, USA, IEEE, vol. 1, Oct. 24, 2004, pp. 473-476, XP010784857.

Office Action dated Mar. 28, 2018, in European Patent Application No. 11856135.6.

Office Action dated Feb. 6, 2018, in Korean Patent Application No. 10-2017-7035944.

Office Action dated Oct. 4, 2018, in Taiwanese Patent Application No. 106137436.

Summons to Attend Oral Proceedings dated Dec. 3, 2018, in European Patent Application No. 11856135.6.

* cited by examiner

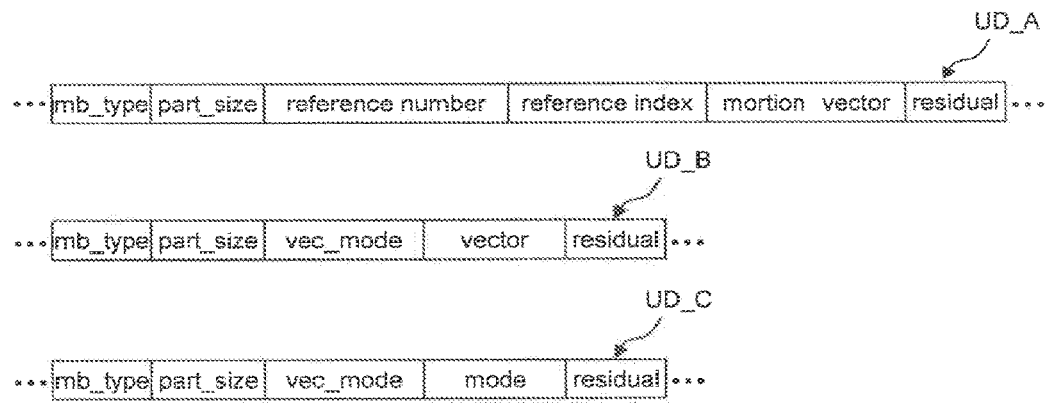

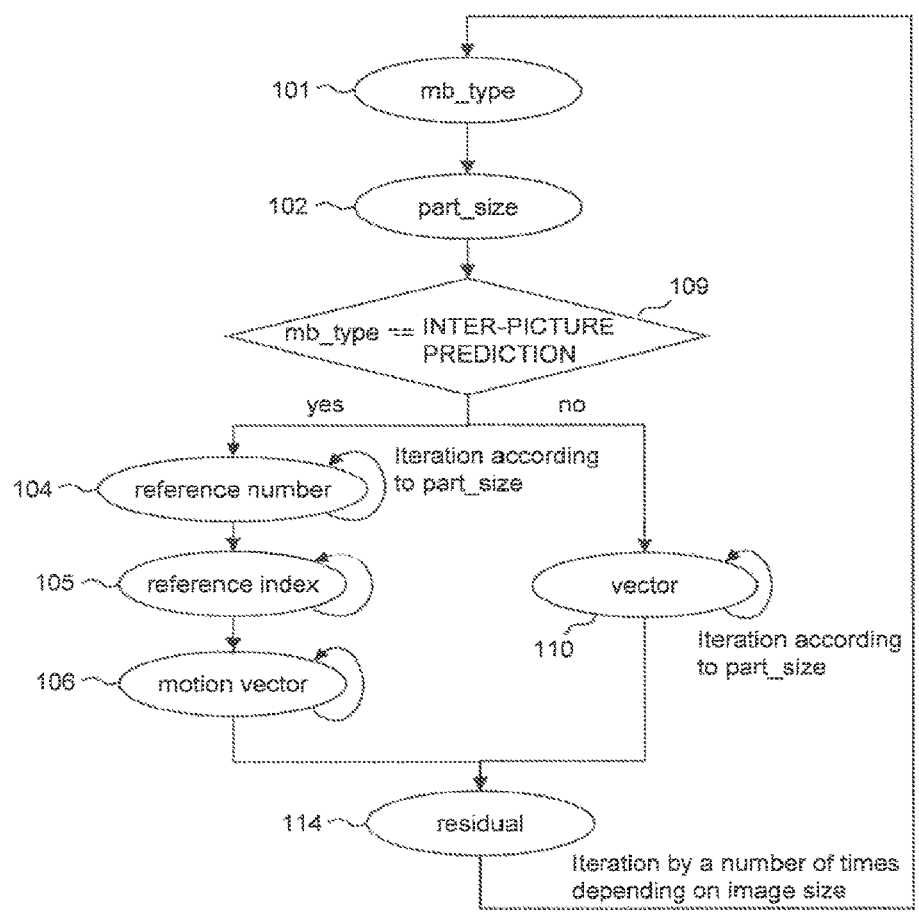

IMAGE CODING DEVICE AND IMAGE DECODING DEVICE

CROSS-REFERENCE TO RELATED APPLICATIONS

The Present application claims priority from Japanese application JP 2011-008902 filed on Jan. 19, 2011, the content of which is hereby incorporated by reference into this application.

TECHNICAL FIELD

The present invention relates to an image coding device operable to perform the prediction and encoding of an image, and an image decoding device operable to perform the prediction and decoding on information subjected to prediction coding, and a technique useful in application to moving image coding/decoding device systems, e.g. a portable telephone, a navigation system, a DVD (Digital Versatile Disc)/HDD (Hard Disk Drive)/BD (Blue-ray Disc) recorder, a digital video camera, a digital camera, a digital television set, and a telephone conference system.

BACKGROUND ART

Conventionally, coding schemes typified by H.264 standardized by MPEG (Moving Picture Experts Group), ITU-T (International Telecommunication Union, Telecommunication Standardization Sector) and the like have been widely used in the area of moving image encoding. To reduce the amount of data, the prediction coding is adopted for these coding schemes. In encoding, differences between an image predicted by a certain method (prediction image) and its original image are encoded and in contrast, in decoding, a decoded image is obtained by adding the differences to a prediction image.

A frame of image is formed by e.g. brightness and two color differences. This format is referred to as YCbCr. A moving image is composed of a sequence of frames of images. In the present digital terrestrial broadcasting, about 30 frames per second are transmitted. Based on this, the techniques for producing a prediction image are roughly classified into two types. The first is a technique such that one frame of image is independently used to perform the prediction within one picture (intra-frame prediction or intra-picture prediction). The other is a technique such that the feature of a sequence of images is used to perform the prediction between pictures (inter-frame prediction or inter-picture prediction). In general, there is a high correlation between frames in a moving image. Therefore, the inter-picture prediction is higher than the intra-picture prediction in the encoding efficiency. However, an image encoded only by the intra-picture prediction is necessary for the top of a moving image, the improvement in the random accessibility in replay and the recovery at occurrence of an error, and in general, such image is inserted once every 0.5 to 2 seconds approximately.

The intra-picture prediction technique and the inter-picture prediction technique are described in Non Patent Documents 1 and 2 respectively. In the Non Patent Documents, the coding process is performed on an image in processing units referred to as macroblocks; the image is divided into the macroblocks of 16 pixels×16 lines. The unit of producing a prediction image may be e.g. 8×8 and 4×4 into which the inside of each macroblock is further finely divided (the unit of producing a prediction image is hereinafter referred to as "block" in this specification).

In the inter-picture prediction, an image already encoded/decoded is used to produce a prediction image. During it, reference index and motion vector showing, for each block, which image to perform the prediction on, and which position in the image to perform the prediction from are encoded. The reference index shows an image to use for the prediction, which is assigned as an image one frame before the current image to Index 0, and an image two frame before the current image to Index 1, for example. The motion vector is represented by a set of values of difference between the position of the current block and the position of an image used for prediction, and it consists of two values of a horizontal component and a vertical component because an image is two-dimensional information. In the Non Patent Document, only a vector of brightness is encoded in a bitstream.

In contrast, in the intra-picture prediction, a prediction image is produced from pixels adjacent to the block following a certain rule. In the Non Patent Documents 1 and 2, nine methods including a method of performing the prediction from left and top pixels are prescribed. In addition, there is a prediction method for each of the brightness and the color difference; such prediction methods for the brightness and the color difference are sometimes different from each other. The other intra-picture prediction techniques include ones of the Patent Documents 1 and 2. According to the documents, a prediction image is produced by specifying a reference position in the same picture by a vector. In other words, a high encoding efficiency can be realized for periodic discrete patterns by using an image currently in the process of coding/decoding for the prediction, instead of an image already coded/decoded in the inter-picture prediction. In the Patent Document 1, the coding efficiency is increased by making the unit for creating a prediction image variable, e.g. making it the unit of 16×16 or 8×8. Further, in the Patent Document 2, a not-yet-coded/decoded area (hereinafter referred to as "not-yet-coded area") included in a reference range is interpolated by use of a multiplied vector, thereby suppressing the reduction in the encoding efficiency in the case of making reference to a range where many not-yet-coded areas are included. This prediction method is hereinafter referred to as "vector prediction".

CITATION LIST

Patent Document

[Patent Document 1] U.S. Patent application publication No. 2003/0202588
[Patent Document 2] International publication WO/2010/082231

Non Patent Document

[Non Patent Document 1] ITU-T H.264, SERIES H: AUDIOVISUAL AND MULTIMEDIA SYSTEMS Infrastructure of audiovisual services—Coding of moving video, Advanced video coding for generic audiovisual services
[Non Patent Document 2] ISO/IEC 14496-10, Information technology—Coding of audio-visual objects—Part 10: Advanced Video Coding

DISCLOSURE OF THE INVENTION

Problems that the Invention is to Solve

To produce a prediction image on a decoding device side, it is necessary to transmit the information about the prediction method from a code device to a decoding device. Specifically, prediction methods include methods of inter-frame prediction and intra-frame prediction, and method of intra-frame prediction includes the vector prediction as described above and other prediction methods. An image cannot be decoded if the information about the prediction method which was used is not transmitted correctly. In addition, the inventor found that information showing what coding scheme was used in units of blocks needs to be reduced in data size even by one bit because a huge amount of data such as 30 frames per second is handled.

It is an object of the invention to provide an image coding device which can ensure the decoding of information encoded according to the intra-frame prediction coding with vector information in terms of transmission of the coding method.

It is another object of the invention to provide an image decoding device which can ensure the decoding of information encoded according to the intra-frame prediction coding with vector information in terms of reception of the coding method.

The above and other objects of the invention and novel features thereof will be apparent from the description hereof and the accompanying drawings.

Means for Solving the Problems

Of the embodiments of the invention herein disclosed, a representative embodiment will be outlined below in brief.

That is, the error between divisional image information targeted for image prediction coding and predicted information is determined to perform the prediction coding, and a data stream is produced according to the process sequence of the prediction coding; in the data stream, a piece of information for identifying the prediction method for each process on the divisional image information, and a piece of information subjected to prediction coding according to the method are arranged. In this time, the data stream has, as pieces of information subjected to prediction coding, a pair of vector information and the error information for each process on the divisional image information in a case where the prediction method is intra-frame prediction coding with vector information.

Effects of the Invention

The effect of the representative embodiment of the invention herein disclosed will be described below in brief.

That is, the decoding of information encoded according to the intra-frame prediction coding with vector information can be ensured in terms of the transmission and reception of the coding method.

BRIEF DESCRIPTION OF THE DRAWINGS

FIG. 4 is an explanatory diagram of vector information and the like.

FIG. 5 is an explanatory diagram illustrating an arrangement of data stream in connection with FIG. 1.

FIG. 11 is an explanatory diagram illustrating the relation between the assignment of the values of a part size (part_size) and a vector mode (vec_mode), and the assignment of the value of a prediction mode (pred_mode).

FIG. 12 is a flow chart illustrating still another procedure of the coding process (decoding process) by the stream-coding part (decoding part).

EXPLANATION OF REFERENCE NUMERALS

Figure 1:
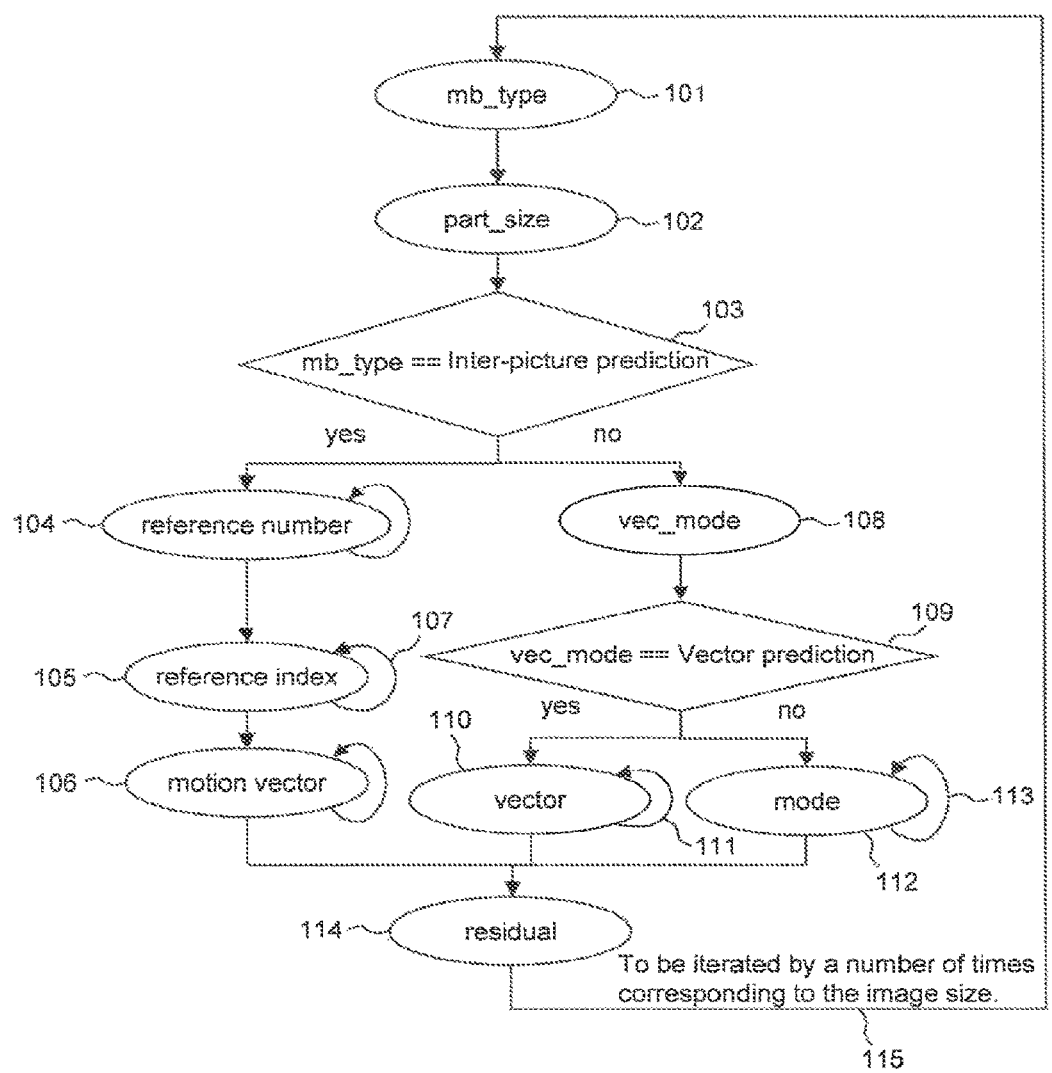
FIG. 1 is a flow chart illustrating a procedure of a coding process (decoding process) by a stream-coding part (decoding part).

30 Already-coded area
40 Not-yet-coded area
41 Coding block
31 Prediction block
BSout, BSin Data stream
10 Image coding device
11 Image-coding part
12 Stream-coding part
VDin Image signal of moving image
20 Image decoding device
21 Stream-decoding part
22 Image-decoding part
CALTH0 Calibration threshold register

DESCRIPTION OF EMBODIMENTS

1. Summary of the Embodiments

The summary of the representative embodiments of the invention herein disclosed will be described first. Here, the reference character strings in the drawings, which are accompanied with paired round brackets and to which reference is made, only illustrate what the concepts of constituents referred to by the character strings contain.

[1] <Data Stream of Coding Device>

The image coding device (10) according to the representative embodiment of the invention has: an image-coding part operable to determine an error between a piece of divisional image information targeted for image prediction coding and a piece of predicted information to perform a prediction coding; and a stream-coding part operable to produce a data stream wherein a piece of information for identifying a prediction method and a piece of information subjected to prediction coding according to the method are arranged, based on a processing result of the prediction coding by the image-coding part for each process on the divisional image information. In this time, the data stream has a pair of vector information and the error information as the information subjected to prediction coding for each process on the divisional image information if the prediction method is intra-frame prediction coding such that vector information is used for specifying a prediction image for producing the predicted information.

From the above, the produced data stream has a piece of information for identifying a prediction method and a piece of information subjected to prediction coding according to the method, which are arranged for each prediction coding. In intra-frame prediction coding with vector information, the data stream has a pair of vector information and the error information as the information subjected to prediction coding. Therefore, the decoding of information coded by the intra-frame prediction coding with vector information can be ensured in terms of transmission of the coding method.

Figure 9:
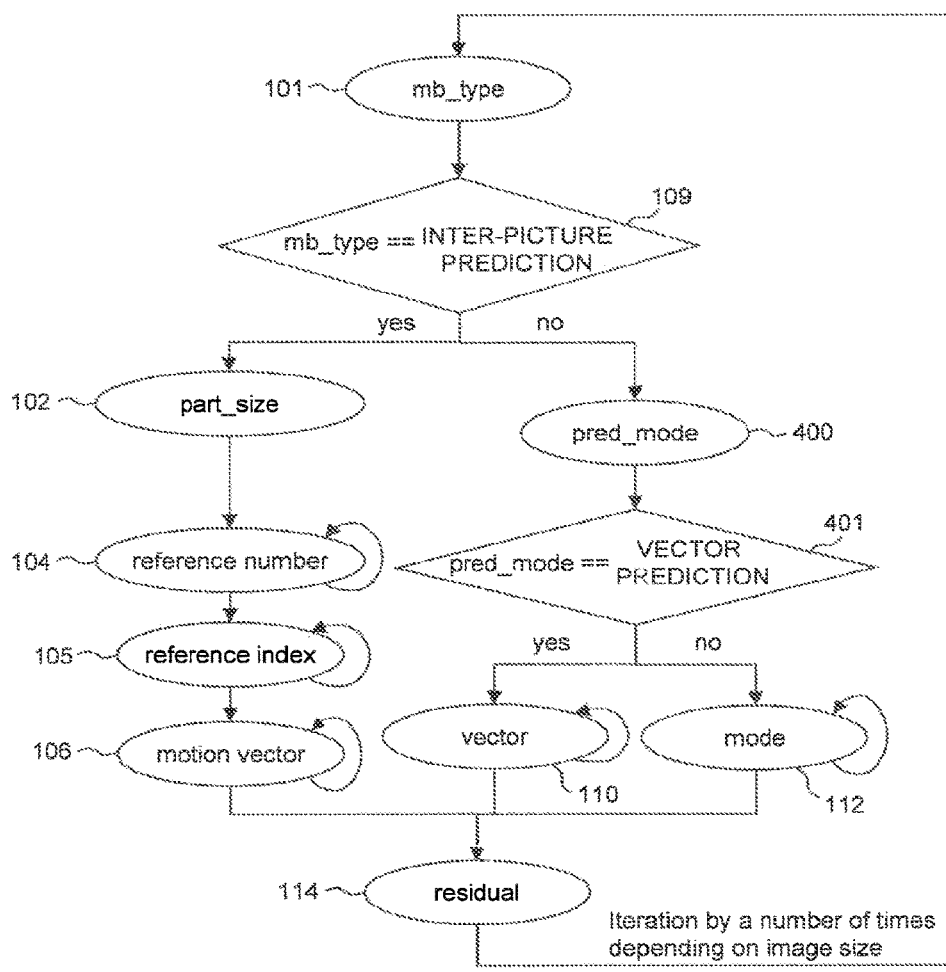
FIG. 9 is a flow chart illustrating still another procedure of the coding process (decoding process) by the stream-coding part (decoding part).

[2] <Macroblock Type and Vector Mode of FIGS. 1 and 9>

In the image coding device of the item #1, the information for identifying the prediction method includes a piece of information (mb_type) showing the prediction on the divisional image information was which of intra-frame prediction and inter-frame prediction, and a piece of information (vec_mode, and pred_mode of FIG. 9) showing whether or not vector information was used for intra-frame prediction.

The information for identifying the prediction method can be represented in units of e.g. 2 bits.

[3] <Pred Mode of FIG. 9←Vec_Mode, Part Size>

In the image decoding device of the item #2, the information showing whether or not vector information was used for intra-frame prediction is a piece of information showing a combination of a sub-size with which the image size of the divisional image information is finely divided, and a piece of information showing whether or not to use vector information for intra-frame prediction.

If there is a margin in the kind of the sub-size with respect to the number of bits which represents the sub-size, the number of bits of information can be reduced by coding two or more constituents collectively in comparison to that in the case of coding for each constituent.

[4] <Compression of the Number of Bits in Pred_Mode of FIG. 9←Vec_Mode, Part Size>

In the image coding device of the item #3, a piece of information showing a combination of a sub-size with which the image size of the divisional image information is finely divided and a piece of information showing whether or not vector information was used for intra-frame prediction is a piece of information represented by a number of bits which is necessary for distinguishing the sub-size in kind by a power of 2.

Since there is a margin in the kind of the sub-size with respect to the number of bits which represents the sub-size, the number of bits of information can be reduced by coding two or more constituents collectively in comparison to that in the case of coding for each constituent.

Figure 6:
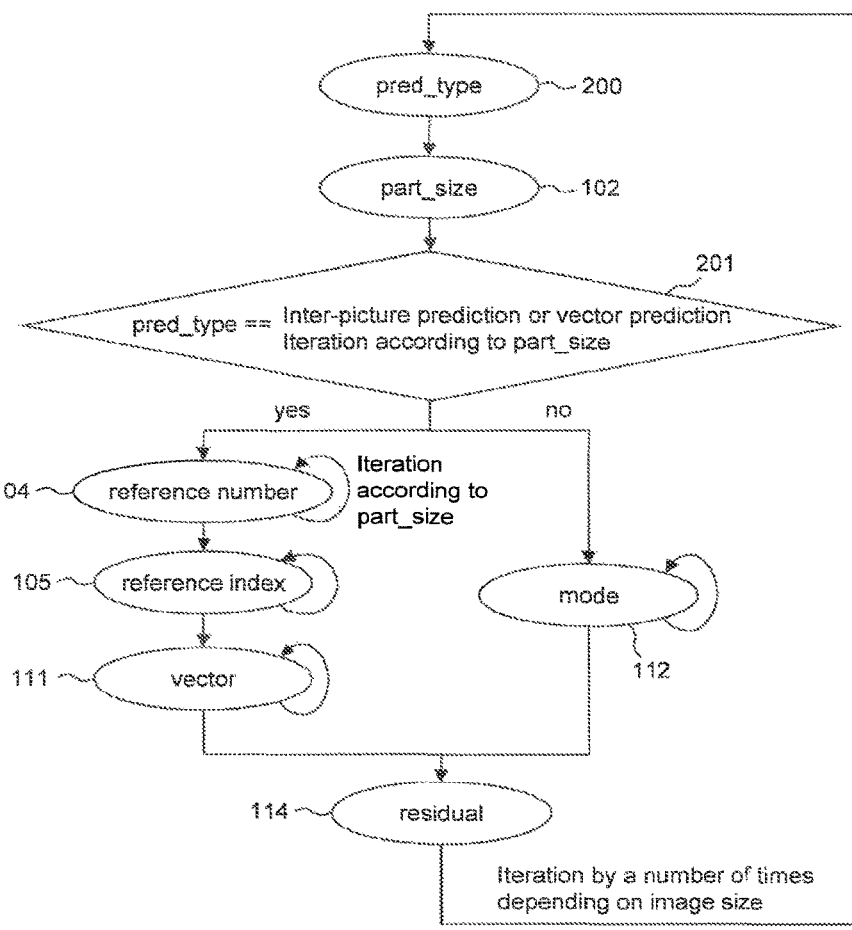
FIG. 6 is a flow chart illustrating another procedure of the coding process (decoding process) by the stream-coding part (decoding part).

[5] <FIG. 6; Substantial Intra-Frame Prediction Wherein its Own Frame is Specified in Inter-Frame Prediction>

In the image coding device of the item#1, the information for identifying a prediction method includes: a piece of information (pred_type) showing whether the prediction on the divisional image information is one of inter-frame prediction and intra-frame prediction with vector information, or other intra-frame prediction; and a piece of information (reference index) showing a frame to refer to by use of the vector information is which frame of a plurality of frames including its own frame and including the divisional image information.

The latter information (reference index) is a piece of information which is, in the first place, necessary for identifying a frame to refer to in inter-frame prediction coding. Since such information is diverted, the information only for identifying the prediction method can be represented in units of one bit which is smaller than that in the item #2 by one bit.

[6] <FIG. 12 in Case of Limiting Intra-Frame Prediction to Vector Prediction>

In the image coding device of the item #1, on condition that only prediction such that vector information is used for intra-frame prediction is adopted, the information for identifying a prediction method is a piece of information (mb_type) showing the prediction on the divisional image information is which of intra-frame prediction and inter-frame prediction.

The information showing whether or not vector information was used for intra-frame prediction becomes unnecessary, whereby the information only for identifying the prediction method can be represented in units of one bit which is smaller than that in the item #2 by one bit.

Figure 14:
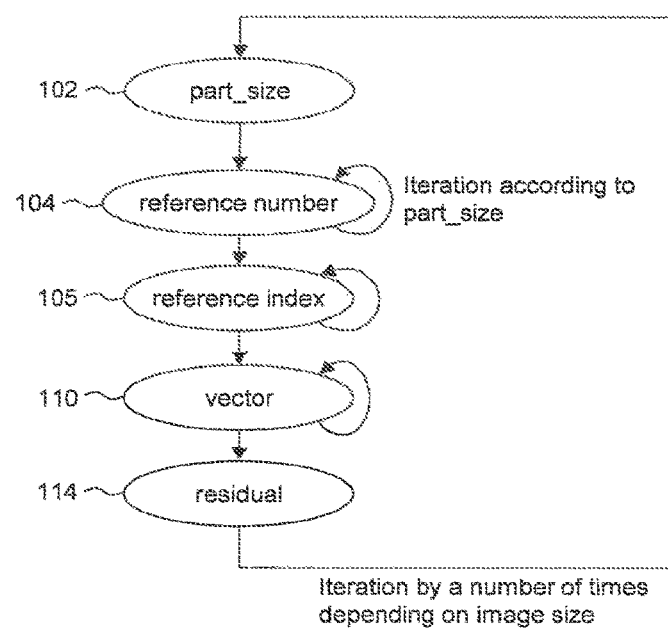
FIG. 14 is a flow chart illustrating still another procedure of the coding process (decoding process) by the stream-coding part (decoding part).

[7] <FIG. 14; Substantial Intra-Frame Prediction with Vectors Wherein its Own Frame is Specified in Inter-Frame Prediction>

In the image coding device of the item #1, on condition that only prediction such that vector information is used for intra-frame prediction is adopted, the information for identifying a prediction method is a piece of information (reference index) showing a frame to refer to is which frame of a plurality of frames including its own frame and including the divisional image information.

The information for identifying a prediction method can be represented in units of one bit which is smaller than that in the item #5 by one bit.

[8] <Brightness Component's Vector Information>

In the image coding device of the item #1, the vector information includes brightness component's vector information.

It is possible to limit vector information in a data stream to bare bones.

[9] <Brightness Component's Vector Information, and Color Difference Component's Vector Information>

In the image coding device of the item #1, on condition that the prediction method identified by the information for identifying a prediction method is prediction coding such that vector information is used for specifying a prediction image to be used for producing the predicted information, the information for identifying a prediction method includes, as the vector information concerned, a piece of information showing which of only brightness component's vector information, and both of brightness component's vector information and color difference component's vector information should be used.

It is possible to select and use, as the vector information, only brightness component's vector information, or both of brightness component's vector information and color difference component's vector information as the need arises.

[10] <Putting Intra-Frame Prediction Coding with Vectors Under the Category of Inter-Frame Prediction Coding>

Figure 2:
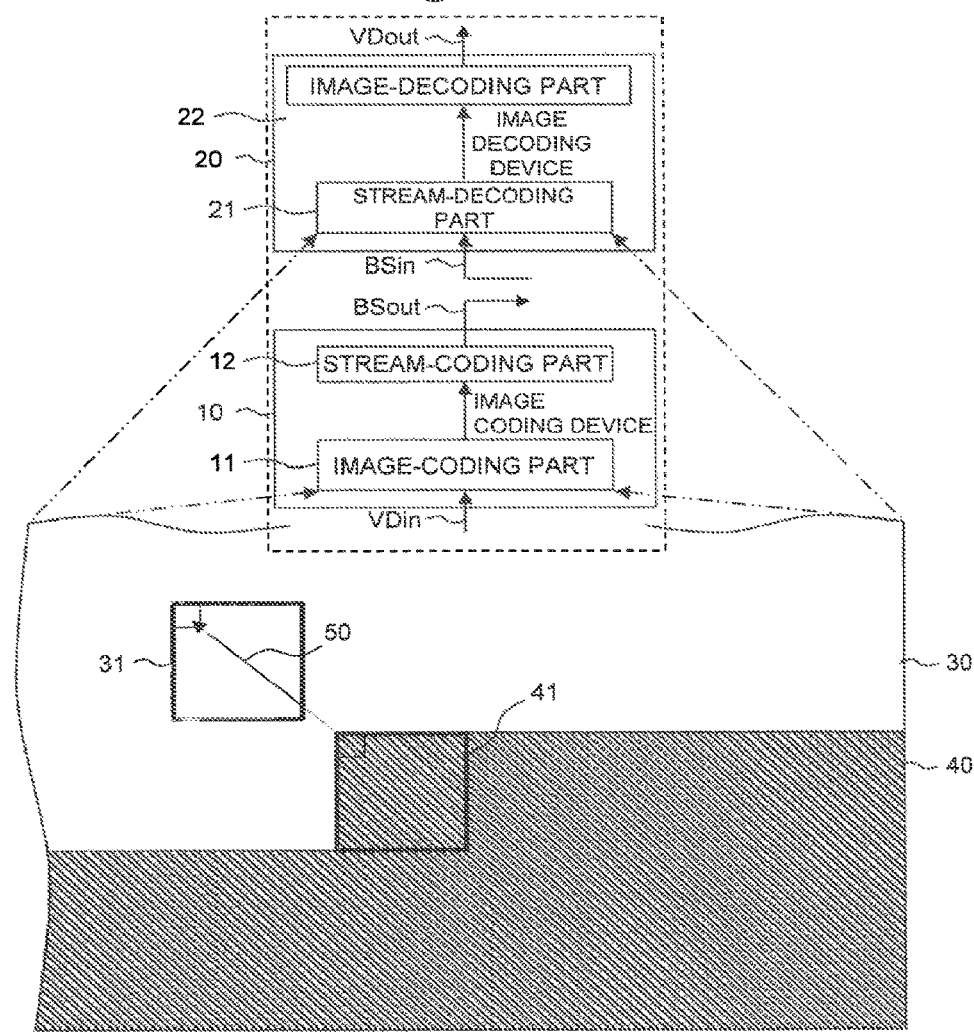
FIG. 2 is a block diagram illustrating an image coding device and an image decoding device which are applicable to moving image coding/decoding device systems such as portable telephones and DVD/HDD/BD recorders/players.

An image coding device (10; FIG. 2 and FIG. 6) according to another representative embodiment of the invention has: an image-coding part operable to determine an error between a piece of divisional image information targeted for image prediction coding and a piece of predicted information to perform prediction coding; and a stream-coding part operable to produce a data stream wherein a piece of information for identifying a prediction method and a piece of information subjected to prediction coding according to the method are arranged, based on a processing result of the prediction coding by the image-coding part for each process on the divisional image information. The data stream has a pair of vector information and the error information as the information subjected to prediction coding for each process on the divisional image information on condition that the prediction method is prediction coding such that vector information is used for specifying a prediction image for producing the predicted information. The information for identifying a prediction method includes a piece of information (pred_type) showing whether prediction on the divisional image information is prediction with vector information or other intra-frame prediction, and a piece of information (reference index) showing a frame to refer to by use of the vector information is which frame of a plurality of frames including its own frame and including the divisional image information. Its own frame including the divisional image information is made a frame targeted for inter-frame prediction coding, whereby intra-frame prediction coding in which vector information is used is performed.

As described above, the intra-frame prediction coding with vector information can be put under the category of inter-frame prediction coding, and the coding method can be transmitted. Especially, the latter information (reference index) is a piece of information which is, in the first place, necessary for identifying a frame to refer to in inter-frame prediction coding. Since such information is diverted, the number of bits of the information only for identifying the prediction method can be reduced.

[11] <Data Stream of Decoding Device>

An image decoding device (20) according to still another representative embodiment of the invention has: a stream-decoding part operable to decode, according to an input sequence, a data stream wherein a piece of information for identifying a prediction method of prediction coding on divisional image information targeted for image prediction coding and a piece of information subjected to prediction coding according to the method are arranged; and an image-decoding part operable to add a piece of error information to a piece of predicted information taken based on image information decoded in the preceding process to decode the image by use of the information for identifying a prediction method and the information subjected to prediction coding according to the method, which are decoded by the stream-decoding part. The data stream has a pair of vector information and the error information as the information subjected to prediction coding for each process on the divisional image information on condition that the prediction method is intra-frame prediction coding such that vector information is used for specifying a prediction image for producing the predicted information.

As described above, a piece of information for identifying a prediction method and a piece of information subjected to prediction coding according to the method are arranged in an input data stream for each prediction coding. To perform intra-frame prediction decoding such that vector information is used, the data stream has a pair of vector information and the error information as the information subjected to prediction coding. Therefore, the decoding of information coded by the intra-frame prediction coding with vector information can be ensured in terms of transmission of the coding method.

[12] <Macroblock Type and Vector Mode of FIG. 1 and FIG. 9>

In the image decoding device of the item #11, the information for identifying a prediction method includes a piece of information (mb_type) showing the prediction on the divisional image information was which of intra-frame prediction and inter-frame prediction, and a piece of information (vec_mode, pred_mode of FIG. 9) showing whether or not vector information was used for intra-frame prediction.

The stream-decoding part can receive the information for identifying a prediction method in units of e.g. two bits.

[13] <Pred Mode of FIG. 9←Vec_Mode, Part Size>

In the image decoding device of the item #12, the information showing whether or not vector information was used for intra-frame prediction is a piece of information showing a combination of a sub-size with which the image size of the divisional image information is finely divided and a piece of information showing whether or not to use vector information for intra-frame prediction.

If there is a margin in the kind of the sub-size with respect to the number of bits which represents the sub-size, the number of bits of information can be reduced by coding two or more constituents collectively in comparison to that in the case of coding for each constituent.

[14] <Compression of the Number of Bits in Pred Mode of FIG. 9←Vec_Mode, Part Size>

In the image decoding device of the item #13, the information showing a combination of a sub-size with which the image size of the divisional image information is finely divided and a piece of information showing whether or not vector information was used for intra-frame prediction is a piece of information represented by a number of bits which is necessary for distinguishing the sub-size in kind by a power of 2.

Since there is a margin in the kind of the sub-size with respect to the number of bits which represents the sub-size, the number of bits of information can be reduced by coding two or more constituents collectively in comparison to that in the case of coding for each constituent.

[15] <FIG. 6; Substantial Intra-Frame Prediction with Vectors Wherein its Own Frame is Specified in Inter-Frame Prediction>

In the image decoding device of the item #11, the information for identifying a prediction method includes a piece of information (pred_type) showing whether prediction on the divisional image information is one of inter-frame prediction and intra-frame prediction with vector information, or other intra-frame prediction, and a piece of information (reference index) showing a frame to refer to by use of the vector information is which frame of a plurality of frames including its own frame and including the divisional image information.

The latter information (reference index) is a piece of information which is, in the first place, necessary for identifying a frame to refer to in inter-frame prediction coding.

Since such information is diverted, the stream-decoding part can receive the information only for identifying the prediction method in units of one bit which is smaller than that in the item #2 by one bit.

[16] <FIG. 12; in Case of Limiting Intra-Frame Prediction to Vector Prediction>

In the image decoding device of the item #11, on condition that only prediction such that vector information is used for intra-frame prediction is adopted, the information for identifying a prediction method is a piece of information (mb_type) showing the prediction on the divisional image information is which of intra-frame prediction and inter-frame prediction.

The information showing whether or not vector information was used for intra-frame prediction becomes unnecessary, and thus the stream-decoding part can receive the information only for identifying the prediction method in units of one bit which is smaller than that in the item #2 by one bit.

[17] <FIG. 14 Substantial Intra-Frame Prediction with Vectors Wherein its Own Frame is Specified in Inter-Frame Prediction>

In the image decoding device of the item #11, on condition that only prediction such that vector information is used for intra-frame prediction is adopted, the information for identifying a prediction method is a piece of information (reference index) showing a frame to refer to is which frame of a plurality of frames including its own frame and including the divisional image information.

The information showing whether or not vector information was used for intra-frame prediction becomes unnecessary, and thus the stream-decoding part can receive the information for identifying the prediction method in units of one bit which is smaller than that in the item #5 by one bit.

[18] <Vector Information of Brightness Component>

In the image decoding device of the item #11, the vector information includes a piece of brightness component vector information.

It is possible to limit, to bare bones, vector information transmitted to the stream-decoding part by a data stream.

[19] <Brightness Component's Vector Information and Color Difference Component's Vector Information>

In the image decoding device of the item #11, on condition that the prediction method identified by the information for identifying a prediction method is prediction coding such that vector information is used for specifying a prediction image to be used for producing the predicted information, the information for identifying a prediction method includes, as the vector information concerned, a piece of information showing which of only brightness component's vector information, and both of brightness component's vector information and color difference component's vector information should be used.

It is possible to select and use, as the vector information, only brightness component's vector information, or both of brightness component's vector information and color difference component's vector information as the need arises.

[20] <Putting Intra-Frame Prediction Coding with Vectors Under the Category of Inter-Frame Prediction Coding>

An image decoding device (20; FIG. 2 and FIG. 6) according to still another representative embodiment of the invention has: a stream-decoding part operable to decode, according to an input sequence, a data stream wherein a piece of information for identifying a prediction method of prediction coding on divisional image information targeted for image prediction coding and a piece of information subjected to prediction coding according to the method are arranged; and an image-decoding part operable to add a piece of error information to a piece of predicted information taken based on image information decoded in the preceding process to decode the image by use of the information for identifying a prediction method and the information subjected to prediction coding according to the method, which are decoded by the stream-decoding part. The data stream has a pair of vector information and the error information as the information subjected to prediction coding for each process on the divisional image information on condition that the prediction method is prediction coding such that vector information is used for specifying a prediction image for producing the predicted information. The information for identifying a prediction method includes a piece of information (pred_type) showing whether prediction on the divisional image information is prediction with vector information or other intra-frame prediction, and a piece of information (reference index) showing a frame to refer to by use of the vector information is which frame of a plurality of frames including its own frame and including the divisional image information. Its own frame to be decoded is made a frame targeted for inter-frame prediction decoding, whereby intra-frame prediction decoding in which vector information is used is performed.

As described above, the intra-frame prediction coding with vector information can be put under the category of inter-frame prediction coding, and the coding method can be transmitted. Especially, the latter information (reference index) is a piece of information which is, in the first place, necessary for identifying a frame to refer to in inter-frame prediction coding. Since such information is diverted, the stream-decoding part can receive a piece of information only for identifying the prediction method with its number of bits reduced.

2. Further Detailed Description of the Embodiments

The embodiments will be described further in detail.

FIG. 2 illustrates an image coding device 10 and an image decoding device 20 which are applicable to a moving image coding/decoding device system such as a portable telephone or DVD/HDD/BD recorders/players. The basic processing forms of the prediction coding and prediction decoding of an image will be described before detailing the image coding device 10 and the image decoding device 20.

In the prediction method, it is necessary to indicate a position to produce a prediction signal on by use of a vector. (A piece of information showing a pixel position in a frame is also hereinafter referred to as "a vector" simply, except as otherwise provided; if the information must be distinguished from "motion vector" used for so-called Motion-Compensated inter-frame coding, the information is referred to as "intra-frame vector".) In FIG. 2, one image includes an already-coded area 30 and a not-yet-coded area 40. When coding a coding block 41, a block (prediction block 31) suitable for use for producing a prediction signal is selected from the already-coded area 30, and its position is indicated as two-dimensional relative position with respect to the coding block 41 (by a prediction vector 50). In the drawing, the vector 50 is represented by the relative position of a pixel located in an upper-left portion of the block 31 (shown as a small quadrangular shape). In the coding, the error (difference) between each pixel signal from inside the coding block 41 and a pixel signal from inside the corresponding prediction block 110 is taken, the signal of the difference is subjected to the orthogonal transformation and quantization, and then the resultant signal and the vector are encoded, and output as a bitstream BSout. The process of decoding is similar to the process of coding. A reproduction image may be formed by setting the not-yet-coded area 40 as a not-yet-decoded area, the coding block 41 as a decoding block targeted for decoding, and the already-coded area 30 as an already-decoded area, and adding the information of the difference to a prediction signal taken from the already-decoded area 30 according to the vector information obtained from the input bitstream BSin.

The image coding device 10 has an image-coding part 11 and a stream-coding part 12. The image-coding part 12 accepts the input of an image signal VDin of a moving image, and determines the error between a piece of divisional image information (i.e. a piece of information corresponding to the coding block 41), which is targeted for image prediction coding, and a piece of predicted information (i.e. a piece of information corresponding to the prediction block 31), thereby performing the prediction coding. According to a process sequence of the coding by the image-coding part 11, the stream-coding part 12 accepts the inputs of a piece of information for identifying the prediction method for each process on the information of the divisional image 41, and a piece of information subjected to the prediction coding by the method, encodes the pieces of information, and produces and outputs a data stream BSout into which the coded information is arranged adequately for the decoding process sequence. The image decoding device 20 has a stream-decoding part 21 and an image-decoding part 22. The stream-decoding part accepts, for each process of the coding, the inputs of a data stream Bsin into which a piece of information for identifying the prediction method of the prediction coding and a piece of information subjected to the prediction coding by the method are arranged, and decodes them according to the input sequence thereof. The image-decoding part 22 uses the information for identifying the prediction method and the information subjected to the prediction coding by the method, which are decoded by the stream-decoding part 21, and adds the error information to a piece of predicted information acquired based on the image information decoded in the preceding process to decode the image.

The representative features which the image coding device 10 and the image decoding device 20 have are the prediction method in vector prediction coding with a piece of vector information, and the representation of the vector information on a data stream BSout, BSin, in other words, how to contribute to the reduction in the amount of transmission data and the increase in the efficiency of the decoding process. The image coding device 10 and the image decoding device 20 will be described below focusing on these points.

First Embodiment

Figure 3:
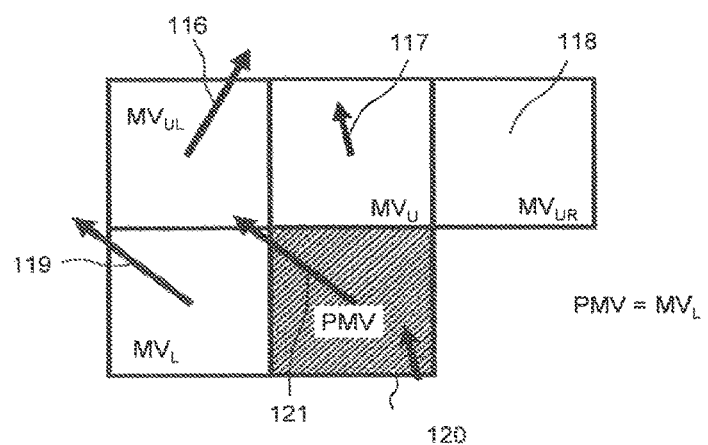
FIG. 3 is an explanatory diagram of a prediction vector.

FIG. 1 illustrates a process procedure of the coding process by the stream-coding part 12. The vector information transmitted by the data stream BSout, BSin from the image coding device to the image decoding device includes values of the vector per se, or difference values between the values of the vector and a prediction vector. In the case of the information including difference values, a prediction vector 121 of the coding-target block 120 will be calculated from vectors 116-119 of blocks close and adjacent to the coding-target block 120 as illustrated in FIG. 3. The prediction vector 121 can be coincident with the vector 119 of the adjacent block on the left (PMV=$MV_L$).

As illustrated by 100 of FIG. 4, the vector information is at least brightness component's vector information, but it may include color difference component's vector information (for each of Cb and Cr). In other words, the vector information is taken by separately performing prediction coding on brightness and color difference components of an image. In this case, it is desired to add the information showing whether or not to use a vector which varies according to brightness and color difference in the prediction coding with vectors (vector prediction coding) as shown in the example of FIG. 4. This is because it is considered that some images need not use a vector which varies according to brightness and color difference. If there are two or more methods for vector prediction coding, a piece of information for identifying the method concerned is required. If it is implicitly specified to use a certain vector prediction coding method, the information for identifying the method may not be elicited.

The process by the image coding device 10 is executed in synchronization with sequential input of image data VDin in turn. The coding process in the stream-coding part 12 of FIG. 1 is performed with the execution of the prediction coding process by the image-coding part 11 in turn. The moving image coding by the image-coding part 11 is broadly classified into inter-frame coding and intra-frame coding. In inter-frame coding, a difference between temporally successive images is encoded, whereas in intra-frame coding, an image is coded separately. (One picture which a moving image includes in coding or decoding process is hereinafter referred to as "image". "Image" can represent any of "frame" and "field" according to progressive signals and interlace signals. For instance, "image" represents "frame" when coding is executed in frames, however in the case of processing in fields, "image" refers to "field". Now, it is noted that "frame", "inter-frame" and "frame memory", which have been generic terms in the coding area, are used as they are, however they are not limited to "frame" of progressive signals, and they can mean any of "frame" and "field" depending on a processing mode at that time.) In general, the amount of data of an image subjected to intra-frame coding is larger than that of an image subjected to inter-frame coding. Despite such being the case, intra-frame coding is a scheme necessary for improvement of the random accessibility at the time of reproduction and for recovery at occurrence of an error as well as the top of video contents (of a sequence), and typically intra-frame coding is periodically selected at intervals of 0.5 to 2 seconds, i.e. 15 to 60 frames.

In the coding process, an image is splintered into blocks, and the block makes a unit of the processing. (Usually, a block is composed of 16 pixels×16 lines, which is referred to as "macroblock" in MPEG. If the unit of processing involved with the invention is different from the size of a macroblock in MPEG, the block is sometimes referred to as "sub-block" to clearly discriminate it from a macroblock.) In intra-frame coding, the coding is performed following the procedure. A prediction signal is produced, for each block, using the value of an already-coded image signal (pixel) within the same image, and then a value of the difference between a signal of a block to be coded, and the prediction signal is subjected to orthogonal transformation and quantization, and thus translated into a code. In parallel, a piece of information which shows the prediction method by which the prediction signal is produced is created as well.

The methods for producing a prediction signal include a method such that a mean value of pixels surrounding a block to be coded is used, and it further includes a method arranged so that prediction methods of two or more directions depending on the image contents' direction are previously defined involving a prediction signal of a coding block yet to be coded, and in a case where the contents of an image have a strong correlation with each other along the lengthwise direction, for example, a direction of prediction preferred for such a case is selected, an already-coded signal neighboring a coding block is repeatedly copied along the selected direction, whereby a prediction signal is produced. In the latter case, a piece of information showing the prediction of which direction was used is taken as a piece of information for identifying the prediction method together. Further, as shown in the Patent Documents 1 and 2, it is also possible to perform an intra-frame prediction coding using vector information. Particularly, as shown in the Patent Document 2, it is possible to use a prediction coding method such that the reduction in the encoding efficiency in the case of making reference to a range including lots of not-yet-coded areas can be suppressed by interpolating each not-yet-coded/decoded area (not-yet-coded area) included in a reference range by use of a multiplied vector. This prediction method is hereinafter referred to as "particular vector prediction".

In the process in the stream-coding part 12 of FIG. 2, a piece of information (macroblock type: mb_type) 101 showing which of the intra-picture prediction and the inter-picture prediction a macroblock has been coded by is created first, and then a piece of information (part size: part_size) 102 showing the way to divide the macroblock into blocks is created, as shown in FIG. 1. The subsequent data structure is varied depending on the value of the macroblock type (mb_type) 101 (103). In a case where the macroblock type (mb_type) 101 is inter-picture prediction, pieces of information are arranged in an order like a piece of information (reference number) 104 showing the number of reference pictures to use, a piece of information (reference index) showing a picture to be referred to, and a piece of information (motion vector) 106 showing the reference position of the reference picture, which are a piece of information showing which image to be referred to in inter-picture prediction, and a piece of information showing which position to be referred to within the image respectively. The pieces of information, the number of which depends on the reference number (reference number) 104 and the part size (part_size) 102, are included in a bitstream because of the iteration of an iteration number 107. Located at the end of the bitstream is a piece of error information (residual) 114. One unit of the resultant data stream is arranged as UD_A of FIG. 5.

In contrast, in the case of intra-picture prediction, the information (vector mode: vec_mode) 108 shows whether to use, as the method of intra-picture prediction, the intra-frame prediction based on the particular vector prediction or the intra-frame prediction without using a vector. After that, in the case of the particular vector prediction, a piece of vector information (vector) 111 including brightness and color difference components is involved; in the method of intra-picture prediction without using a vector, a piece of information (prediction mode: mode) 112 for identifying the method is taken. The number of vectors to be used in intra-picture prediction, which can be obtained by the iteration of the process of taking the vector information (vector) 111, varies depending on what kind of blocks the macro block is to be divided into, or whether it to use the same vector for both the brightness and color difference, or to use different vectors for them respectively. The vector mode (vec_mode) 108 herein holds a piece of information showing whether or not to use the same vector for the brightness and color difference. Alternatively, the information may be held by a piece of information of a higher layer (representing Slice of Non Patent Documents 1 and 2 or the like). Based on the pieces of information described above, a given number of vectors are to be included in a bitstream. Located at the end of the bitstream is a piece of error information (residual) 114. One unit of data stream having a prediction mode (mode) 112 in the sequence is arranged as UD_C of FIG. 5. One unit of data stream having a piece of vector information (vector) 111 in the sequence is arranged as UD_B of FIG. 5.

The number of iterations of the prediction mode (mode) 112 is determined only by the part size (part_size) 102.

Each sequence of process or each piece of information shown in the flow of FIG. 1 is iterated by a number of times corresponding to the image size (115), whereby one picture or frame of coded information is output as data streams BSout, and conveyed to the image decoding device.

According to the first embodiment, in the data stream BSout thus produced, pieces of information (mb_type 101, vec_mode 108 and mode 113) for identifying the prediction method and pieces of information subjected to prediction coding (102, 104-107 and 114) according to the method for each prediction coding are arranged; in intra-frame prediction coding with vector information, the data stream BSout has, as pieces of information subjected to prediction coding, pieces of vector information 110, the error information 114 and the like. Therefore, it is possible to ensure the decoding of information coded by the intra-frame prediction coding with vector information in terms of the transmission of the coding method.

Particularly in the case of FIG. 1, the information for identifying the prediction method consists of a piece of information (mb_type) 101 showing the prediction on the divisional image information was which of intra-frame prediction and inter-frame prediction, and a piece of information (vec_mode) 108 showing whether or not vector information was used for intra-frame prediction. The information for identifying the prediction method can be represented e.g. in units of two bits.

Second Embodiment

FIG. 6 illustrates another procedure of the coding process by the stream-coding part 12 of FIG. 2. This is the procedure of a process such that substantial intra-frame prediction is performed by specifying its own frame in inter-frame prediction. In other words, the following are involved as the information for identifying the prediction method: a piece of information (pred type: pred_type) 200 showing that prediction for image information is inter-frame prediction or intra-frame prediction with vector information, or other intra-frame prediction; and a reference index (reference index) 105. The reference index (reference index) 105 herein serves as a piece of information showing a frame to refer to by the vector information is which frame of a plurality of frames including its own frame targeted for coding. The vector (vector) 110 and the motion vector (motion vector) 106 are generically referred to as the vector (vector) 111.

Figure 7:
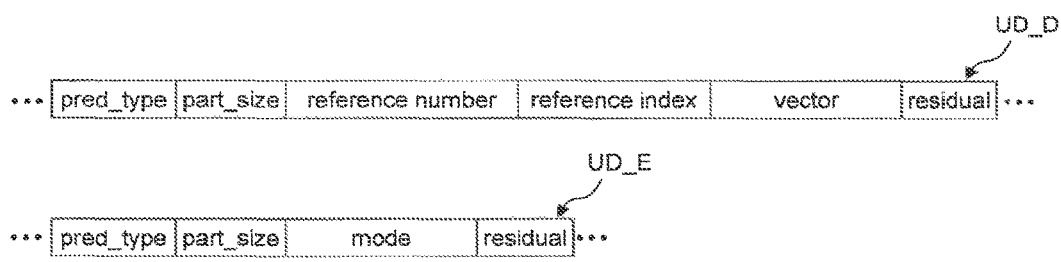
FIG. 7 is an explanatory diagram illustrating an arrangement of data stream in connection with FIG. 6.

The other things are the same as those in FIG. 1 and therefore, the detailed descriptions thereof will be skipped here. One unit of data stream having a reference index (reference index) 105 in the sequence is arranged as UD_D of FIG. 7. One unit of data stream having a prediction mode (mode) 112 in the sequence is arranged as UD_E of FIG. 7.

Figure 8:
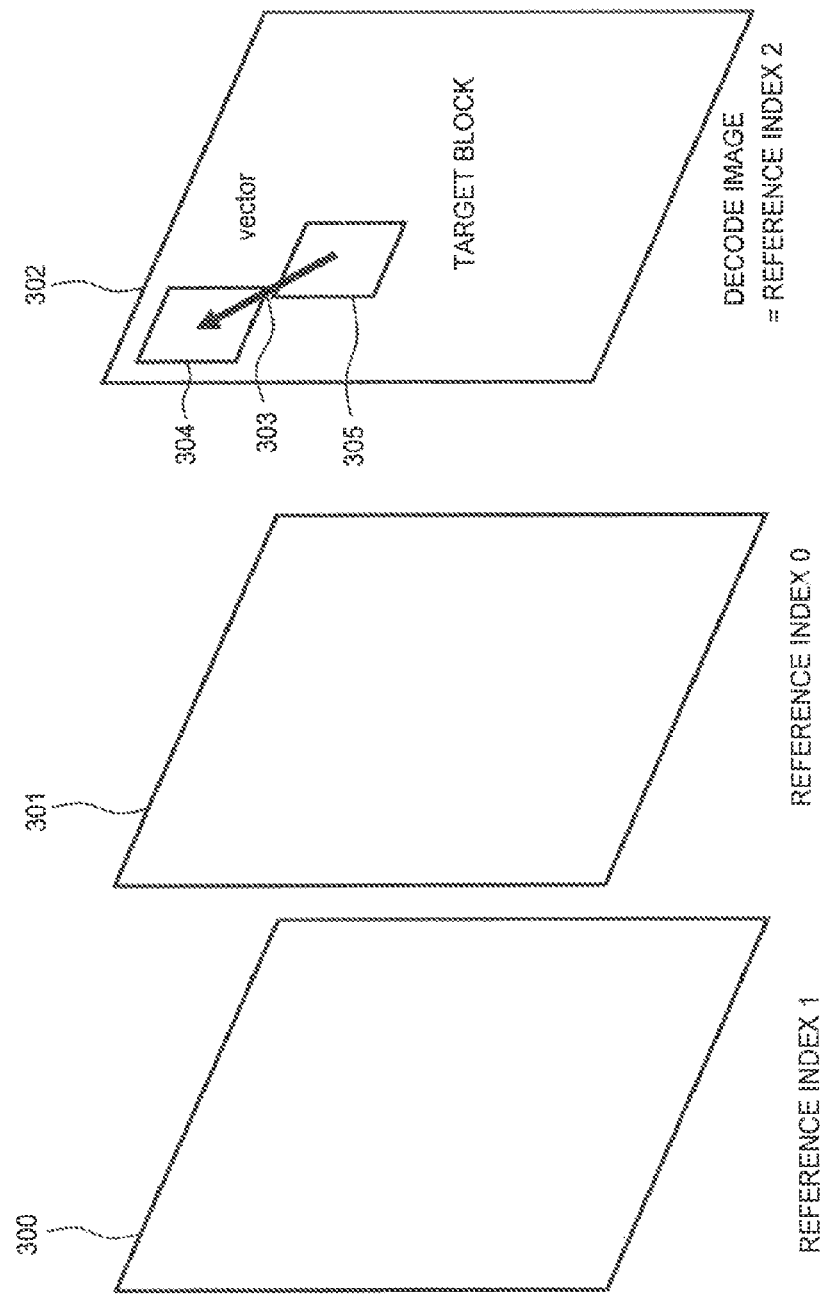
FIG. 8 is an explanatory diagram showing a concrete example of the way of specifying a reference frame by a reference index.

FIG. 8 shows a concrete example where a reference frame is specified by the reference index (reference index) 105. In the example of FIG. 8, in a case such that a value of 0 or value of 1 is specified as the reference index (reference index) 105, reference is made to the image 300 or 301, and inter-frame prediction is performed. In contrast, in a case such that a value of 2 is specified as the reference index (reference index) 105, reference is made to the area 304 indicated by the vector 303 within the image 302 in the process of coding at present, the image of 304 is made a prediction image of the coding-target block 305. With regard to whether what value of the reference index (reference index) 105 corresponds to the image in processing at present or not, it may be judged that the image in the process of coding at present is pointed out on condition that the reference index value is the minimum or maximum of possible values of the reference index (reference index) 105. Alternatively, adding, to a higher layer such as Slice, a piece of information about what reference index value the image in the process of coding at present is assigned to, the judgment may be made by use of the information. Further, in a case where it is desired to change whether or not to use different vectors by brightness and color difference respectively for each macro block, a vector mode (vec_mode) 108 which is the same as that in FIG. 1 is added next to the reference index (reference index) 105, and further the number of vectors may be conveyed. Hence, reference will be made to a plurality of reference pictures according to the reference number (reference number) 104; reference can be made to two or more areas in vector prediction, and both the vector prediction and the inter-frame prediction can be used. In such cases, a prediction image of the current block may be made by producing prediction images according to respective reference positions, and weighting and adding up the results.

According to the second embodiment, the reference index (reference index) 105 is a piece of information which is, in the first place, necessary for identifying a frame to refer to in inter-frame prediction coding, and such information is diverted and as such, a piece of information only for identifying the prediction method can be represented by one bit which is one bit smaller than that in FIG. 1. Therefore, it is possible to contribute to the increase in the compression rate of image information according to prediction coding.

Third Embodiment

FIG. 9 illustrates still another procedure of the coding process by the stream-coding part 12 of FIG. 2. This is arranged so that a piece of information (pred mode: pred_mode) 400 into which the part size (part_size) 102 and the vector mode (vec_mode) 108 described with reference to FIG. 1 are consolidated is used instead of them. Specifically, the pred mode (pred_mode) 400 is a piece of information showing a combination of the part size (part_size) 102 showing the sub-size of a macro block, and the vector mode (vec_mode) 108 showing whether or not to use the vector information for intra-frame prediction. In the case of FIG. 9, the part size (part_size) 102 is coded only at the time of inter-frame prediction; in a case such that intra-frame prediction is used, the pred mode (pred_mode) 400 is coded. It is made possible by the value of the pred mode (pred_mode) 400 to obtain pieces of information representing the part size (part_size) 102 and the vector mode (vec_mode) 108 of FIG. 1 at a time. While in FIG. 1, the number of vectors is determined by values of the part size (part_size) 102 and vector mode (vec_mode) 108, in FIG. 9 it is determined by only the value of the pred mode (pred_mode) 400. The processes or data after the pred mode (pred_mode) 400 are the same as those in FIG. 1 and therefore, the detailed description thereof is skipped.

Figure 10:
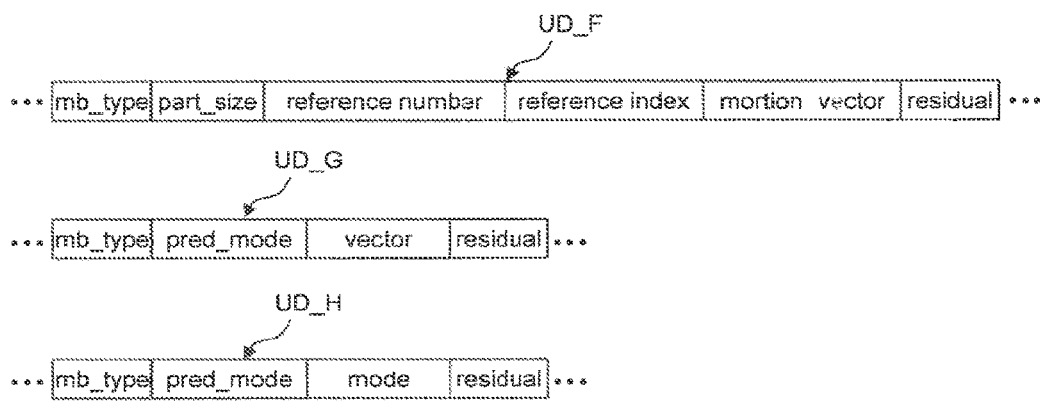
FIG. 10 is an explanatory diagram illustrating an arrangement of data stream in connection with FIG. 9.

One unit of data stream having a part size (part size) 102 in the sequence is arranged as UD_F of FIG. 10. One unit of data stream having a vector (vector) 110 in the sequence is arranged as UD_G of FIG. 10. One unit of data stream having a mode (mode) 112 in the sequence is arranged as UD_H of FIG. 10.

FIG. 11 illustrates the relation between the assignment of values of the part size (part_size) 102 and vector mode (vec_mode) 108, and the assignment of the value of the pred mode (pred_mode) 400. If there is a margin in the kind of the sub-size, i.e. the number of vectors with respect to the number of bits of the part size (part_size) 102, the number of bits of information can be reduced by coding two or more constituents collectively in comparison to that in the case of coding for each constituent. For instance, as illustrated by FIG. 11, six states distinguished by the 3-bit part size (part_size) 102, and two states distinguished by the 1-bit vector mode (vec_mode) 108 can be distinguished by the 3-bit pred mode (pred_mode) 400, and the number of data bits can be reduced by one bit per unit of the data stream BSout.

Fourth Embodiment

FIG. 12 illustrates still another procedure of the coding process by the stream-coding part 12 of FIG. 2. This is an embodiment in a case where the intra-frame prediction is limited to the vector prediction in the process of FIG. 1. Therefore, the vector mode (vec_mode) 108 and mode (mode) 112 of FIG. 1 are unnecessary.

Figure 13:
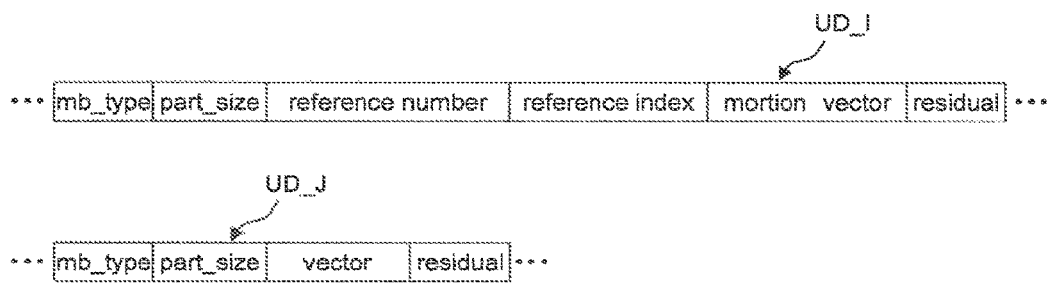
FIG. 13 is an explanatory diagram illustrating an arrangement of data stream in connection with FIG. 12.

One unit of data stream having a reference number (reference number) 104 in the sequence is arranged as UD_I of FIG. 13. One unit of data stream having a vector (vector) 110 in the sequence is arranged as UD_J of FIG. 13.

Now, in a case where it is desired to change whether or not to use different pieces of vector information according to brightness and color difference in units of a macroblock, the procedure may be arranged so that the vector mode (vec_mode) 108 as in FIG. 1 is added before the vector (vector) 110 of FIG. 12 to convey the number of vectors, the illustration of which is omitted in FIG. 12.

Fifth Embodiment

Figure 15:
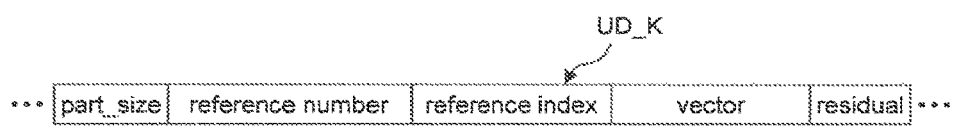
FIG. 15 is an explanatory diagram illustrating an arrangement of data stream in connection with FIG. 14.

FIG. 14 illustrates still another procedure by the coding process by the stream-coding part 12. This is an embodiment in a case where the intra-frame prediction is limited to the vector prediction in the process in FIG. 6. Therefore, the pred_type (pred_type) 200 and mode (mode) 112 of FIG. 6 are unnecessary. As in the case of FIG. 6, since a judgment on whether the prediction is inter-picture prediction or vector prediction is made according to the value of the reference index (reference index) 105, the coding of the macroblock type (mb_type) is unnecessary. One unit of data stream in this case is arranged as UD_K of FIG. 15.

Now, in a case where it is desired to change whether or not to use different pieces of vector information according to brightness and color difference in units of a macroblock, the procedure may be arranged so that the vector mode (vec_mode) 108 as in FIG. 1 is added before the vector (vector) 110 of FIG. 14 to convey the number of vectors, the illustration of which is omitted in FIG. 14.

Sixth Embodiment

The processing order of the decoding process by the stream-decoding part 21 of FIG. 2 is the same as the processing order of the coding by the stream-coding part 12. Therefore, by substituting the coding in the coding process by the stream-coding part 12, which has been described concerning the first to fifth embodiments, with the decoding, the details of the process by the stream-coding part 12 can be regarded as the details of the process by the stream-decoding part 21. In regard to the sixth to tenth embodiments, the process by the stream-decoding part 21 will be described while making reference to the drawings to which reference is made in the description on the stream-coding part 12.

FIG. 1 also illustrates the procedure of the decoding process by the stream-decoding part 21, and the stream decoding process corresponding to the stream coding process according to the first embodiment will be described. The vector information conveyed by the data stream BSout, BSin from the image coding device to the image decoding device is a vector value per se, or a difference value between a vector value and a prediction vector. If the vector information is a difference value, that the prediction vector is calculated as described with reference to FIG. 3, for example, which is the same as the procedure which has been described in connection with image coding and therefore, the detailed description thereof is omitted here. The vector information is at least brightness component's vector information, but it may include color difference component's vector information (for each of Cb and Cr), which is the same as in the case of image coding. If there are two or more methods for producing a prediction image, a piece of information 100A for identifying the method is transmitted. If it is implicitly specified to use a certain vector prediction decoding method, it is not necessary to transmit the information 100A.

The process by the image decoding device 20 is executed in synchronization with sequential input of the data stream BSin in turn. The decoding process of the stream-decoding part 21 of FIG. 2 is performed in the order of input of the data stream BSin.

In the process in the stream-decoding part 21 of FIG. 2, a piece of information (macroblock type: mb_type) 101 showing which of the intra-picture prediction and the inter-picture prediction a macroblock has been coded by is decoded first, and then a piece of information (part size: part_size) 102 showing the way to divide the macroblock into blocks is decoded. The subsequent data structure is varied depending on the value of the macroblock type (mb_type) 101 (103). In a case where the macroblock type (mb_type) 101 is inter-picture prediction, pieces of information are arranged in an order like a piece of information (reference number) 104 showing the number of reference pictures to use, a piece of information (reference index) showing a picture to be referred to, and a piece of information (motion vector) 106 showing the reference position of the reference picture, which are a piece of information showing which image to be referred to in inter-picture prediction, and a piece of information showing which position to be referred to within the image respectively. The pieces of information, the number of which depends on the reference number (reference number) 104 and the part size (part_size) 102, are included in a bitstream because of the iteration of an iteration number 107. Located at the end of the bitstream is a piece of error information (residual) 114. One unit formed by the input data stream BSin is arranged as UD_A of FIG. 5.

In contrast, in the case of intra-picture prediction, the information (vector mode: vec_mode) 108 shows whether to use, as the method of intra-picture prediction, the intra-frame prediction based on the particular vector prediction or intra-frame prediction without using a vector. After that, in the case of the particular vector prediction, a piece of vector information (vector) 111 including brightness and color difference components is involved; in the picture prediction method without using a vector, a piece of information (prediction mode: mode) 112 for identifying the method is taken. The number of vectors to be used in intra-picture prediction, which can be obtained by the iteration of the process of taking the vector information (vector) 111, varies depending on what kind of blocks the macroblock is to be divided into, or whether to use the same vector for both the brightness and color difference, or to use different vectors for them respectively. The vector mode (vec_mode) 108 herein holds a piece of information showing whether or not to use the same vector for the brightness and color difference. Alternatively, the information may be held by a piece of information of a higher layer (representing Slice of Non Patent Documents 1 and 2 or the like). Based on the pieces of information described above, a given number of vectors are to be included in a bitstream. Located at the end of the bitstream is a piece of error information (residual) 114. One unit of data stream BSin having a prediction mode (mode) 112 in the sequence is arranged as UD_C of FIG. 5. One unit of data stream BSin having a piece of vector information (vector) 111 in the sequence is arranged as UD_B of FIG. 5.

The number of iterations of the prediction mode (mode) 112 is determined only by the part size (part_size) 102.

Each sequence of process or each piece of information shown in the flow of FIG. 1 is iterated by a number of times corresponding to the image size (115), whereby one picture or frame of decoded information is supplied to the image-decoding part 22, and the image is decoded according to the information.

According to the sixth embodiment, in the input data stream BSin, pieces of information (mb_type 101, vec_mode 108 and mode 113) for identifying the prediction method and pieces of information subjected to prediction coding (102, 104-107 and 114) according to the method for each prediction coding are arranged; in intra-frame prediction coding with vector information, the data stream BSin has, as pieces of information subjected to prediction coding, pieces of vector information 110, the error information 114 and the like. Therefore, the decoding of information coded by the intra-frame prediction coding with vector information is ensured in terms of the transmission of the coding method.

Seventh Embodiment

FIG. 6 also illustrates another procedure of the decoding process by the stream-decoding part 21 of FIG. 2. The stream decoding process corresponding to the stream coding process according to the second embodiment will be described. This corresponds to the procedure of a process in which substantial intra-frame prediction is performed by specifying its own frame in inter-frame prediction. In other words, the followings are decoded as the information for identifying the prediction method: a piece of information (pred type: pred_type) 200 showing that prediction for image information is inter-frame prediction or intra-frame prediction with vector information, or other intra-frame prediction; and a reference index (reference index) 105. The reference index (reference index) 105 herein serves as a piece of information showing a frame to refer to by the vector information is which frame of a plurality of frames including its own frame targeted for decoding. The vector (vector) 110 and the motion vector (motion vector) 106 are generically referred to as the vector (vector) 111.

The other things are the same as those in the sixth embodiment which has been described based on FIG. 1 and therefore, the detailed descriptions thereof will be skipped here. One unit of data stream BSin having a reference index (reference index) 105 in the sequence is arranged as UD_D of FIG. 7. One unit of data stream BSin having a prediction mode (mode) 112 in the sequence is arranged as UD_E of FIG. 7.

A concrete example of the reference index (reference index) 105 specifying a reference frame in data stream decoding is the same as in FIG. 8 and therefore, the detailed description thereof is skipped here.

According to the seventh embodiment, the reference index (reference index) 105 is a piece of information which is, in the first place, necessary for identifying a frame to refer to in inter-frame prediction coding, and such information is diverted to the data stream BSin and as such, a piece of information only for identifying the prediction method can be represented by one bit which is one bit smaller than that in FIG. 1. Therefore, the data amount of the data stream BSin to decode is reduced.

Eighth Embodiment

FIG. 9 shows another example of the procedure of the decoding process by the stream-decoding part 21 of FIG. 2. The stream decoding process corresponding to the stream coding process according to the third embodiment will be described.

In this embodiment, a piece of information (pred mode: pred_mode) 400 into which the part size (part_size) 102 and the vector mode (vec_mode) 108 described with reference to FIG. 1 are consolidated is conveyed instead of them. Specifically, the pred mode (pred_mode) 400 is a piece of information showing a combination of the part size (part_size) 102 showing the sub-size of a macroblock, and the vector mode (vec_mode) 108 showing whether or not to use the vector information for intra-frame prediction. In the case of FIG. 9, the part size (part_size) 102 is coded only at the time of inter-frame prediction; in a case such that intra-frame prediction is used, the pred mode (pred_mode) 400 is coded. It is made possible by the value of the pred mode (pred_mode) 400 to obtain pieces of information representing the part size (part_size) 102 and the vector mode (vec_mode) 108 of FIG. 1 at a time. While in FIG. 1, the number of vectors is determined by values of the part size (part_size) 102 and vector mode (vec_mode) 108, in FIG. 9 it is determined by only the value of the pred mode (pred_mode) 400. The processes or data after the pred mode (pred_mode) 400 are the same as those in FIG. 1 and therefore, the detailed description thereof is skipped.

One unit of data stream BSin having a part size (part size) 102 in the sequence is arranged as UD_F of FIG. 10. One unit of data stream BSin having a vector (vector) 110 in the sequence is arranged as UD_G of FIG. 10. One unit of data stream BSin having a mode (mode) 112 in the sequence is arranged as UD_H of FIG. 10.

The relation between the assignment of values of the part size (part_size) 102 and vector mode (vec_mode) 108, and the assignment of the value of the pred mode (pred_mode) 400 is the same as in FIG. 11 and therefore, the detailed description thereof is skipped here.

Ninth Embodiment

FIG. 12 also illustrates still another procedure of the decoding process by the stream-coding part 12 of FIG. 2, and the stream decoding process corresponding to the stream coding process according to the fourth embodiment will be described. This corresponds to a case where the intra-frame prediction is limited to the vector prediction in the process of FIG. 1. Therefore, the vector mode (vec_mode) 108 and mode (mode) 112 of FIG. 1 are unnecessary.

One unit of data stream BSin having a reference number (reference number) 104 in the sequence is arranged as UD_I of FIG. 13. One unit of data stream BSin having a vector (vector) 110 in the sequence is arranged as UD_J of FIG. 13.

Now, in a case where it is desired to change whether or not to use different pieces of vector information according to brightness and color difference in units of a macroblock, the vector mode (vec_mode) 108 as in FIG. 1 is added before the vector (vector) 110 of FIG. 12 to convey the number of vectors, the illustration of which is omitted in FIG. 12.

Tenth Embodiment

FIG. 14 also illustrates still another procedure of the coding process by the stream-coding part 12, and the stream decoding process corresponding to the stream coding process according to the fifth embodiment will be described. This corresponds to a case where the intra-frame prediction is limited to the vector prediction in the process of FIG. 6. Therefore, the pred_type (pred_type) 200 and mode (mode) 112 of FIG. 6 are unnecessary. As in the case of FIG. 6, since a judgment on whether the prediction is inter-picture prediction or vector prediction is made according to the value of the reference index (reference index) 105, the coding of the macroblock type (mb_type) is unnecessary. One unit of data stream BSin in this case is arranged as UD_K of FIG. 15.

Now, in a case where it is desired to change whether or not to use different pieces of vector information according to brightness and color difference in units of a macroblock, the vector mode (vec_mode) 108 as in FIG. 1 is added before the vector (vector) 110 of FIG. 14 to convey the number of vectors, the illustration of which is omitted in FIG. 14.

Eleventh Embodiment

The description on the method of calculating a vector used in vector prediction by use of a result of decoding of a vector on a bitstream in the image decoding device is divided into a first part concerning brightness and a second part concerning color difference, which will be presented in turn.

First, the method of calculating a brightness vector will be described. A value determined by decoding a bitstream is used as the value of a brightness vector. Alternatively, there is a coded vector difference value on a bitstream, and a value determined by adding the value obtained from the bitstream to a prediction vector calculated on a decoder side is made a value of brightness vector. The former method has the advantage that a circuit for calculating a vector can be simplified while the amount of data is increased. The latter method has the advantage that the amount of data is reduced because only a difference value is sent. The method of producing a prediction vector is to be described below.

As to the prediction vector, it is assumed that in the positional relation of the blocks illustrated in FIG. 3, the vector 119 used in vector prediction of the block on the left is made a prediction vector 121 of the current block 120. In a case where there is not the left block for a reason such that the current block is located in the left end of the picture, or where the left block is subjected to no vector prediction, the vector 117 of the upper block is used instead. In case that the upper block does not meet the condition, the upper left block vector 116, or the upper right block vector 118 is used, otherwise a predetermined fixed value is used as a value of the prediction vector. A vector to use for prediction can be obtained by adding, to the prediction vector so obtained, a difference value of a vector obtained by decoding a bitstream. Further, in another method of calculating a prediction vector, the prediction vector is made the average or central value of vectors of vicinal blocks including left and upper ones. In the calculation, a vector of a block subjected to no vector prediction is treated as a predetermined fixed value, otherwise is not taken into account.

Further, in another method of calculating a prediction vector, the prediction vector is the vector of a block to use vector prediction which has been decoded just before the current block in the decoding order. In a case where the current block is a block to use vector prediction and which is first decoded in the current image, the last vector prediction vector of the preceding image is used, otherwise a predetermined fixed value is used as the prediction vector.

Further, in another method of calculating a prediction vector, a value of a prediction vector is coded into a higher layer such as Slice, the coded value is used as the prediction vector.

Further, in another method of calculating a prediction vector, the prediction vector is made a vector of a block in the same position in an already decoded image. In the case of no decoded image (the first image or the like), or the block in the position concerned is subjected to no vector prediction, a predetermined fixed value is used as the prediction vector. In regard to the method of selecting an image which has been decoded, a piece of information concerning which decoded image to use may be transmitted for each macroblock, and it may be conveyed with a higher layer such as Slice. This method can be combined with the method described above. For instance, in the case of a combination of this method and the first one, this method is applied to obtain a prediction vector from an already decoded image on condition that the left and upper blocks, etc. are subjected to no vector prediction in the first method. Further, the order for applying the methods can be changed adequately as in the case of first implementing this method, and then the first method.

Next, the method of calculating a color difference vector will be described. On condition that no color difference vector has been coded, a brightness component vector which is scaled according to image sizes of brightness and color difference is used as a color difference vector. In contrast, on condition that a color difference vector has been coded, the prediction vector is obtained in the same way as a brightness component vector. The color difference vector is obtained by adding a difference value of a vector decoded from a bitstream. Aside from a method of calculating a brightness component prediction vector, a color difference prediction vector may be a brightness component vector scaled according to image sizes of brightness and color difference in value. Further, this method may be combined with the method of calculating a brightness component prediction vector. For instance, in the case of the combination with the first method, a brightness vector which has been scaled is used as a color difference prediction vector if the left and upper blocks are subjected to no vector prediction. The method of predicting a color difference component vector from a brightness component in this way can be used in combination with another prediction method. In addition, as with a brightness component, it is possible to combine the three methods, namely this method, the method of calculating a prediction vector from a decoded image, and another method other.

Also, in coding, a prediction vector is produced according to the same procedure as that in decoding, and a difference between a vector used for vector prediction and a prediction vector is coded in the encoder into a data stream. In case where a prediction vector is not produced, a vector value used for vector prediction is coded into a data stream.

Twelfth Embodiment

Figure 16:
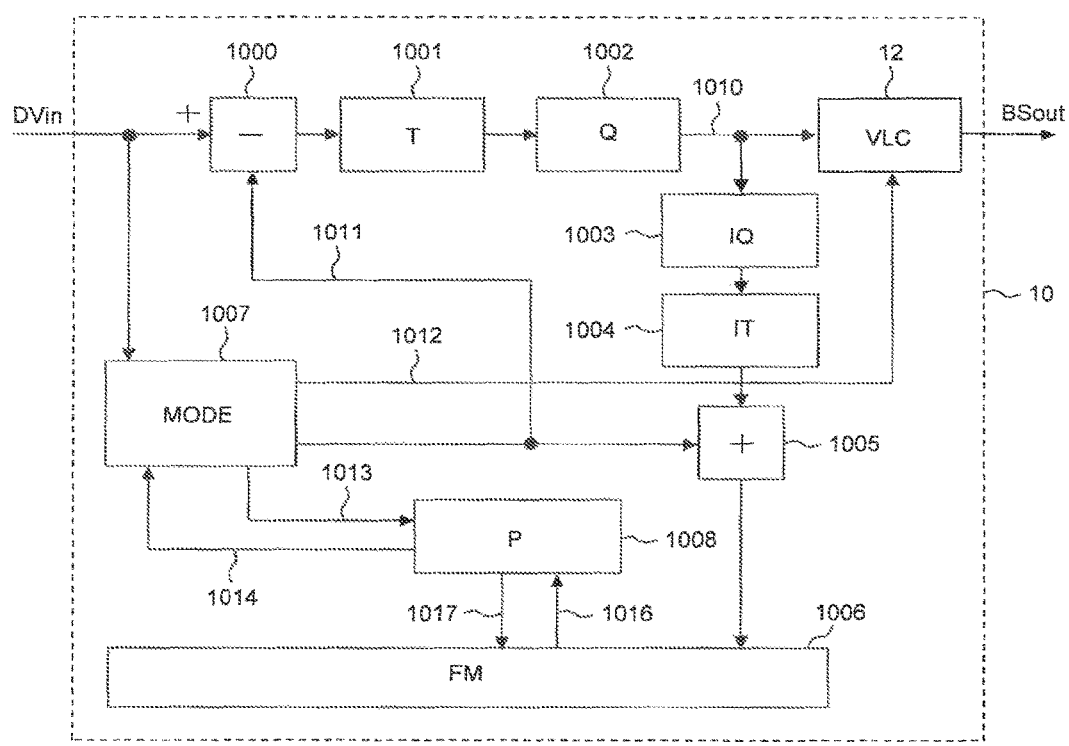
FIG. 16 is a block diagram showing a concrete example of the image coding device.

FIG. 16 shows a concrete example of the image coding device 10. In FIG. 16, the image-coding part 11 of FIG. 2 includes circuits of 1000-1008.

An input image signal DVin is divided and input in blocks. The difference circuit (−) 1000 determines a difference of the input signal DVin with a prediction signal 1011 for each pixel. Then, the input signal goes through the orthogonal transform circuit (T) 1001 and the quantization circuit (Q) 1002 and is converted into a signal 1010, which is coded in stream-coding part (VLC) 12 and output as a data stream BSout. In parallel, the signal 1010 is subjected to an inverse transform into a difference signal by the inverse quantization circuit (IQ) 1003 and the inverse orthogonal transform circuit (IT) 1004, which is thereafter added to the prediction signal 1011 for each pixel in the adding circuit (+)1005. Thus, the same image signal (local decode image) as that obtained in the image decoding device can be obtained. The local decode image is written into the frame memory (FM) 1006, and used for the process of producing a subsequent prediction signal 1011.

The prediction signal 1011 is produced in the prediction-mode deciding circuit (MODE) 1007 as described below. The input image signal (coding block) DVin is input to the prediction-mode deciding circuit 1007. The prediction-mode deciding circuit 1007 prepares candidate vectors (which are used differently from the eleventh embodiment in meaning and correspond to vectors used for vector prediction of the eleventh embodiment) for obtaining candidates of a prediction signal of the coding block concerned, and inputs them to the prediction signal generator circuit (P) 1008 as candidate vectors 1013 in turn. The prediction signal generator circuit 1008 accesses an already-coded area of the frame memory (corresponding to an already-decoded area in the case of the decoding device to be described later) with an address signal 1017, takes a pixel signal 1016, and produces a prediction signal 1014 according to a specified candidate vector from the taken pixel signal. The prediction-mode deciding circuit 1007 takes differences between the input signals DVin (coding block signals) and prediction block signals (1014) in pixels, and calculates prediction errors. Then, after having calculated prediction errors of all the candidate vectors, the prediction-mode deciding circuit sets the candidate vector involving the smallest prediction error (offering a prediction signal the most similar to the input signal) as a vector 1012 used for vector prediction, and outputs the prediction signal 1011 corresponding to the vector 1012 used for vector prediction. Incidentally, the vector 1012 used for vector prediction is arranged to form part of the data stream BSout in the encoding part 12.

Although no special restriction is intended, the prediction-mode deciding circuit 1007 outputs, as the vector 1012 used for vector prediction, a motion vector in the case of inter-frame prediction, and a vector (vector) in the case of intra-frame prediction. Other information which is necessary for forming a data stream BSout is produced by the prediction-mode deciding circuit 1007, and supplied to the stream-coding part 12.

Figure 17:
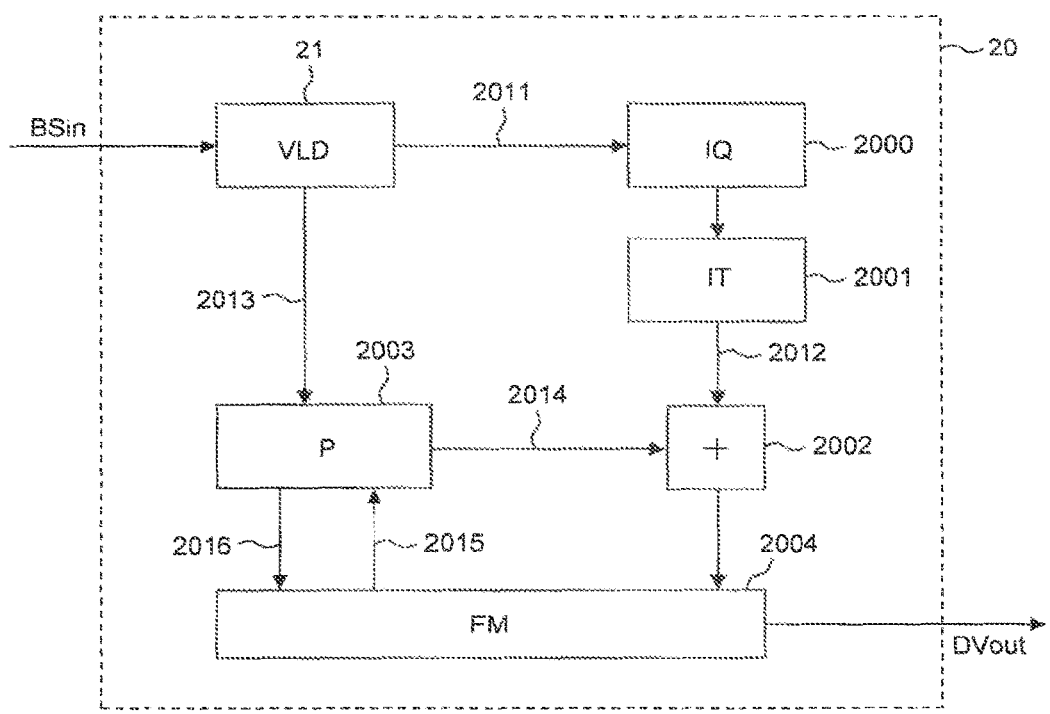
FIG. 17 is a block diagram showing a concrete example of the image decoding device.

FIG. 17 shows a concrete example of the image decoding device 20. In FIG. 17, the image-decoding part 22 of FIG. 2 includes circuits of 2000-2004.

The input data streams BSin includes, for each of blocks forming an image, a vector used for vector prediction, and information of a difference signal for a prediction signal. The stream-decoding part (VLD) 21 decodes the data stream BSin, and extracts a vector 2013 used for vector prediction, a piece of difference information 2011, and the like. The difference information 2011 is converted into a difference signal 2012 by the inverse quantization circuit (IQ) 2000 and the inverse orthogonal transform circuit (IT) 2001. In parallel with this, the prediction signal generator circuit (P) 2003 creates an address 2016 for specifying an already-decoded area of the frame memory (FM) 2015 based on the vector 2013 used for vector prediction, takes a pixel signal 2015 of the address, and produces a pixel signal 2014 of the prediction block. The resultant pixel signal 2014 of the prediction block is added to the difference signal 2012 in the image-reproducing circuit (+) 2002, whereby the image of the block concerned is reproduced. The reproduced image is written to the frame memory 2004, and used as a candidate for producing a prediction image in reproducing an image of a subsequent block. After the end of the decoding process of one picture, signals of the produced image are output as output signals DVout, and displayed on a display device such as a television set or the like.

Although no special restriction is intended, the prediction signal generator circuit 2003 uses the vector 2013 used for vector prediction as motion vector in the case of inter-frame prediction, and uses a vector (vector) as the vector 2013 used for vector prediction in the case of intra-frame prediction. Other information that the data stream BSin includes is decoded in the stream-decoding part 21, and used for the process by the prediction signal generator circuit 2003 and the like.

While the invention made by the inventor has been concretely described above based on the embodiments, the invention is not limited to the embodiments. It is obvious that various changes and modifications may be made without departing from the subject matter thereof.

INDUSTRIAL APPLICABILITY

The present invention relates to an image coding device operable to perform the prediction coding of an image, and an image decoding device operable to perform the prediction decoding on a piece of information subjected to prediction coding, and it can be widely applied to the moving image coding/decoding device system technology.

What is claimed is:

1. An apparatus configured to encode a video in a form of a plurality of sequential images, comprising:
    an image coding circuit configured to:
        generate an intra-frame vector, the intra-frame vector indicating a relative position of a prediction block with respect to a coding block within one image;
        generate a motion vector, the motion vector indicating a position of the prediction block with respect to a coding block included in a temporally successive image;
        output a prediction signal based on an input video signal, the intra-frame vector, and the motion vector; and
        determine a difference between the input video signal and the prediction signal; and
    a stream coding circuit configured to generate and output a data stream based on the determined difference, the intra-frame vector, and the motion vector, the data stream comprising:
        a reference index indicating an image to be referred to;
        the intra-frame vector;
        the motion vector;
        a pred type indicating whether prediction on the coding block is one of inter-frame prediction and intra-frame prediction with intra-frame vector, or other intra-frame prediction; and
        a mode including information for identifying a method of intra-frame coding process,
    wherein, when the pred type indicates inter-frame prediction and intra-frame prediction with intra-frame vector, and the reference index indicates an image including the coding block to be referred to, the stream coding circuit outputs a data stream comprising the pred type, the reference index, and the intra-frame vector,
    wherein, when the pred type indicates inter-frame prediction and intra-frame prediction with intra-frame vector, and the reference index indicates a temporally successive image to be referred to, the stream coding circuit outputs a data stream comprising the pred type, the reference index, and the motion vector, and
    wherein, when the pred indicates other intra-frame prediction, the stream coding circuit outputs a data stream comprising the pred type and the mode.

2. The apparatus according to claim 1, wherein the image coding circuit is further configured to:
    generate a plurality of candidate vectors for generating the prediction signal;
    produce a plurality of candidate prediction signals, each one of the candidate prediction signals corresponding to one of the plurality of candidate vectors;
    set a prediction signal which is most similar to the input signal from the plurality of candidate prediction signals; and
    output the candidate vector corresponding to the prediction signal as the intra-frame vector or the motion vector to the stream coding circuit.

3. The apparatus according to claim 1, wherein the intra-frame vector or the motion vector includes brightness and color difference components.

4. An apparatus configured to decode a data stream to obtain a video, comprising:
    a stream-decoding circuit configured to decode the data stream, the data stream comprising:
        a reference index indicating an image to be referred to;
        an intra-frame vector, the intra-frame vector indicating a relative position of a prediction block with respect to a coding block within one image;
        a motion vector, the motion vector indicating a position of the prediction block with respect to a coding block included in a temporally successive image; and
        a pred type indicating whether prediction on the coding block is one of inter-frame prediction and intra-frame prediction with intra-frame vector, or other intra-frame prediction; and
an image-decoding circuit configured to decode an image by use of the reference index, the motion vector, and the intra-frame vector,
wherein, when the pred type indicates inter-frame prediction and intra-frame prediction with intra-frame vector, and the reference index indicates an image including the coding block to be referred to, the image-decoding circuit decodes the image the intra-frame prediction with the intra-frame vector,
wherein, when the pred type indicates inter-frame prediction and intra-frame prediction with intra-frame vector, and the reference index indicates a temporally successive image to be referred to, the image-decoding circuit decodes the image by the inter-frame prediction with the motion vector, and
wherein, when the pred type indicates other intra-frame prediction, the image-decoding circuit decodes the image by the intra-frame prediction without the motion vector or the inter-frame vector.

5. The apparatus according to claim 4, wherein the data stream further comprises:
a mode including information for identifying a method of intra-frame coding process,
wherein, when the pred type indicates other intra-frame prediction, the image-decoding circuit decodes the image by the intra-frame prediction with the mode.

\* \* \* \* \*